United States Patent
Li et al.

(10) Patent No.: US 12,457,041 B2
(45) Date of Patent: Oct. 28, 2025

(54) APPARATUS AND METHOD FOR MEASURING NONLINEAR SYSTEM NOISES

(71) Applicant: Fujitsu Limited, Kawasaki (JP)

(72) Inventors: Jingnan Li, Beijing (CN); Zhenning Tao, Beijing (CN)

(73) Assignee: Fujitsu Limited, Kawasaki (JP)

( * ) Notice: Subject to any disclaimer, the term of this patent is extended or adjusted under 35 U.S.C. 154(b) by 254 days.

(21) Appl. No.: 18/311,080

(22) Filed: May 2, 2023

(65) Prior Publication Data

US 2023/0370168 A1 Nov. 16, 2023

(30) Foreign Application Priority Data

May 10, 2022 (CN) .......................... 202210502703.9

(51) Int. Cl.
*H04B 10/58* (2013.01)
*H04B 10/2575* (2013.01)
*H04B 10/61* (2013.01)

(52) U.S. Cl.
CPC ....... *H04B 10/58* (2013.01); *H04B 10/25759* (2013.01); *H04B 10/6163* (2013.01)

(58) Field of Classification Search
None
See application file for complete search history.

(56) References Cited

U.S. PATENT DOCUMENTS

| | | | | |
|---|---|---|---|---|
| 6,690,884 B1* | 2/2004 | Kelty | ................... | H04B 10/695 714/704 |
| 2002/0048062 A1* | 4/2002 | Sakamoto | ........ | H04B 10/25137 398/30 |
| 2011/0318021 A1* | 12/2011 | Zhou | ................... | H04L 27/0014 375/376 |
| 2018/0069626 A1 | 3/2018 | Zhao | | |
| 2020/0092026 A1* | 3/2020 | Birk | ................. | H04J 14/02122 |

(Continued)

FOREIGN PATENT DOCUMENTS

| | | |
|---|---|---|
| CN | 107147440 A | 9/2017 |
| CN | 112583478 A | 3/2021 |

(Continued)

OTHER PUBLICATIONS

L. Martino and J. Miguez, "A generalization of the adaptive rejection sampling algorithm," Statistics and Computing, vol. 21, pp. 633-647, Jan. 1, 2011 2011.

(Continued)

*Primary Examiner* — Darren E Wolf
(74) *Attorney, Agent, or Firm* — STAAS & HALSEY LLP

(57) ABSTRACT

An apparatus and method to measure nonlinear system noises may include a processor to generate a bilateral notch signal, a unilateral notch signal and a multi-tone signal; to measure power of an additive Gaussian white noise of a nonlinear system by using the multi-tone signal; to measure a first power-to-noise ratio of the nonlinear system by using the bilateral notch signal; to measure a second power-to-noise ratio of the nonlinear system by using the unilateral notch signal. The processor is to calculate a nonlinear power-to-noise ratio of the nonlinear system and a power-to-noise ratio introduced by IQ imbalance according to the power of the additive Gaussian white noise, the first power-to-noise ratio and the second power-to-noise ratio.

9 Claims, 7 Drawing Sheets

(56) References Cited

U.S. PATENT DOCUMENTS

| | | | |
|---|---|---|---|
| 2020/0112376 A1 | 4/2020 | Jiang et al. | |
| 2021/0111789 A1 | 4/2021 | Li et al. | |
| 2022/0070044 A1* | 3/2022 | Vaquero-Caballero | ............... H04B 1/1027 |

FOREIGN PATENT DOCUMENTS

| | | |
|---|---|---|
| CN | 112585890 A | 3/2021 |
| CN | 113556173 A | 10/2021 |

OTHER PUBLICATIONS

F. H. Irons, K. J. Riley, D. M. Hummels, and G. A. Friel, "The noise power ratio-theory and ADC testing," IEEE Transactions on Instrumentation and Measurement, vol. 49, pp. 659-665, 2000.

F. J. Vaquero-Caballero, D. J. Ives and S. J. Savory, "Transceiver Noise Characterization Based on Perturbations," Journal of Lightwave Technology, vol. 39, pp. 5799-5804, 2021.

\* cited by examiner

APPARATUS AND METHOD FOR MEASURING NONLINEAR SYSTEM NOISES

CROSS REFERENCE TO RELATED APPLICATIONS

This application claims priority under 35 USC 119 to Chinese patent application no. 202210502703.9, filed on May 10, 2022, in the China National Intellectual Property Administration, the entire contents of which are incorporated herein by reference.

TECHNICAL FIELD

This disclosure relates to the field of communication technologies.

BACKGROUND

In a communication system, a coherent transmitter at a transmitter end modulates a transmit signal from a baseband in phase and quadrature signal to a carrier. After channel transmission, a coherent receiver at a receiver end recovers it to a baseband IQ signal. Due to nonideality of an actual device, the coherent transmitter and receiver may cause damages to the IQ signal. When gains of a driver amplifier (DA) of the transmitter and/or the transimpedance amplifier (TIA) of the receiver are relatively small, the IQ signal is mainly affected by IQ imbalance and an additive white Gaussian noise (AWGN). When the gains of the driving amplifier of the transmitter and/or the transimpedance amplifier of the receiver are relatively large, the IQ signal is affected not only by the IQ imbalance and additive noise, but also by a nonlinear noise. As costs introduced by different noises are different, it is necessary to separate the noises.

Currently, in existing techniques, nonlinear noises of a nonlinear system or a nonlinear device may be measured via notch signals.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in a case where a nonlinear noise, IQ imbalance and an additive white Gaussian noise of a nonlinear system all exist, the nonlinear noise, IQ imbalance and additive white Gaussian noise of the nonlinear system are unable to be separated in the existing techniques.

In order to solve at least one of the above problems, embodiments of this disclosure provide an apparatus and method for measuring nonlinear system noises, in which a nonlinear noise, IQ imbalance and an additive white Gaussian noise of a nonlinear system may be separated, and relevant parameters may be measured accurately.

According to a first aspect of the embodiments of this disclosure, there is provided an apparatus for measuring nonlinear system noises, the apparatus including: a generating unit configured to generate a bilateral notch signal, a unilateral notch signal and a multi-tone signal; a first measurement unit configured to measure power of an additive Gaussian white noise of a nonlinear system by using the multi-tone signal; a second measurement unit configured to measure a first power-to-noise ratio of the nonlinear system by using the bilateral notch signal; a third measurement unit configured to measure a second power-to-noise ratio of the nonlinear system by using the unilateral notch signal; and a first calculating unit configured to calculate a nonlinear power-to-noise ratio of the nonlinear system and a power-to-noise ratio introduced by IQ imbalance according to the power of the additive Gaussian white noise, the first power-to-noise ratio and the second power-to-noise ratio.

According to a second aspect of the embodiments of this disclosure, there is provided an apparatus for estimating performance of a nonlinear system, the apparatus including: the apparatus for measuring nonlinear system noises according to the first aspect of the embodiments of this disclosure configured to obtain power of an additive Gaussian white noise, nonlinear power-to-noise ratio and power-to-noise ratio introduced by IQ unbalance of the nonlinear system at multiple notch center frequencies, establish an equivalent additive noise model according to the power of the additive Gaussian white noise, the nonlinear power-to-noise ratio and the power-to-noise ratio introduced by IQ imbalance of the nonlinear system at multiple center frequencies of notches, and estimate performance of the nonlinear system according to the equivalent additive noise model.

According to a third aspect of the embodiments of this disclosure, there is provided an electronic device, including the apparatus according to the first or second aspect of the embodiments of this disclosure.

According to a fourth aspect of the embodiments of this disclosure, there is provided a method for measuring nonlinear system noises, the method including: generating a bilateral notch signal, a unilateral notch signal and a multi-tone signal; measuring power of an additive Gaussian white noise of a nonlinear system by using the multi-tone signal; measuring a first power-to-noise ratio of the nonlinear system by using the bilateral notch signal; measuring a second power-to-noise ratio of the nonlinear system by using the unilateral notch signal; and calculating a nonlinear power-to-noise ratio of the nonlinear system and a power-to-noise ratio introduced by IQ imbalance according to the power of the additive Gaussian white noise, the first power-to-noise ratio and the second power-to-noise ratio.

According to a fifth aspect of the embodiments of this disclosure, there is provided a method for estimating performance of a nonlinear system, the method including: obtaining power of an additive Gaussian white noise, nonlinear power-to-noise ratio and power-to-noise ratio introduced by IQ unbalance of the nonlinear system at multiple notch center frequencies in the method for measuring nonlinear system noises according to the fourth aspect of the embodiments of this disclosure; establishing an equivalent additive noise model according to the power of the additive Gaussian white noise, the nonlinear power-to-noise ratio and the power-to-noise ratio introduced by IQ imbalance of the nonlinear system at multiple center frequencies of notches; and estimating performance of the nonlinear system according to the equivalent additive noise model.

An advantage of the embodiments of this disclosure exists in that:

the power of the additive Gaussian white noise, the first power-to-noise ratio and the second power-to-noise ratio of the nonlinear system may respectively be measured by using the multi-tone signal, bilateral notch signal and unilateral notch signal, and the nonlinear power-to-noise ratio of the nonlinear system and the power-to-noise ratio introduced by IQ imbalance may be calculated according to the power of the additive Gaussian white noise, the first power-to-noise ratio and the second power-to-noise ratio, thereby separating the nonlinear noise, IQ imbalance and additive white Gaussian noise of the nonlinear system, and accurately measuring relevant parameters.

Furthermore, the power of the additive Gaussian white noise, the nonlinear power-to-noise ratio and the power-to-noise ratio introduced by IQ imbalance of the nonlinear system at multiple center frequencies of notches may be obtained according to the above methods, thereby establishing the equivalent additive noise model, and performance of the nonlinear system may be accurately estimated according to the equivalent additive noise model.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

The embodiment of this disclosure provides a method for measuring nonlinear system noises.

Figure 1:
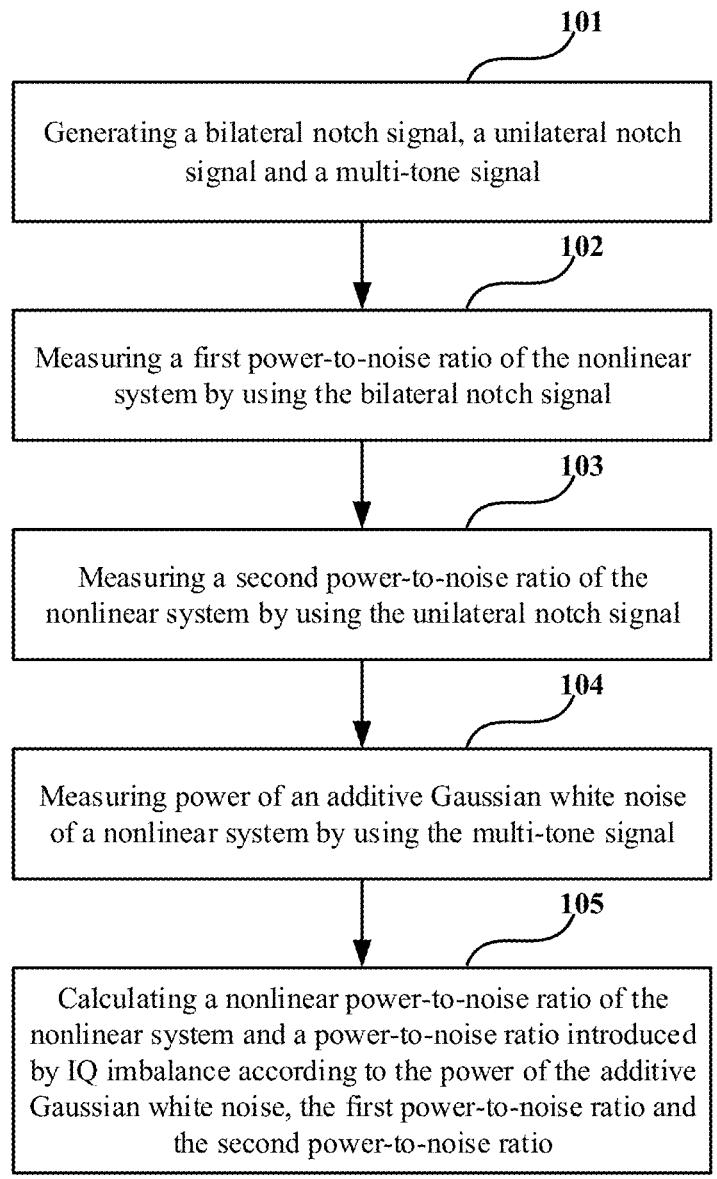
FIG. 1 is schematic diagram of the method for measuring nonlinear system noises of Embodiment 1 of this disclosure.

FIG. 1 is schematic diagram of the method for measuring nonlinear system noises of Embodiment 1 of this disclosure. As shown in FIG. 1, the method includes:

step 101: generating a bilateral notch signal (dual side notch signal), a unilateral notch signal (single side notch signal) and a multi-tone signal;

step 102: measuring a first power-to-noise ratio of the nonlinear system by using the bilateral notch signal;

step 103: measuring a second power-to-noise ratio of the nonlinear system by using the unilateral notch signal;

step 104: measuring power of an additive Gaussian white noise of a nonlinear system by using the multi-tone signal; and step 105: calculating a nonlinear power-to-noise ratio of the nonlinear system and a power-to-noise ratio introduced by IQ imbalance according to the power of the additive Gaussian white noise, the first power-to-noise ratio and the second power-to-noise ratio.

In this way, the nonlinear noise, IQ imbalance, and additive white Gaussian noise of the nonlinear system may be separated, and relevant parameters may be measured accurately.

An order of execution of steps 102, 103 and 104 is not limited in the embodiment of this disclosure.

In some embodiments, the nonlinear systems may be various systems or devices that generate nonlinear effects. For example, the nonlinear system is a communication system or a part of a communication system, such as a coherent transmitter and/or a coherent receiver.

In some embodiments, various methods may be used to generate the bilateral notch signals, the unilateral notch signal and the multi-tone signal, which shall be illustrated below.

A method for generating the bilateral notch signal is as follows.

In some embodiments, a frequency component amplitude of a spectrum of a two-dimensional signal (i.e. a complex signal I+jQ) within a unilateral notch bandwidth and its mirror frequency bandwidth may be zeroed out by transmitter digital signal processing.

Figure 2:
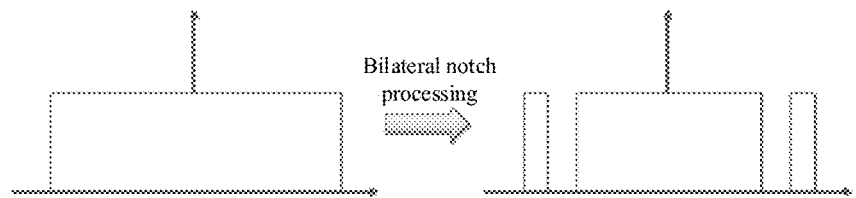
FIG. 2 is a schematic diagram of forming a bilateral notch signal in Embodiment 1 of this disclosure.

FIG. 2 is a schematic diagram of forming the bilateral notch signal in Embodiment 1 of this disclosure. As shown in FIG. 2, in a frequency domain, by bilateral notch processing, the bilateral notch signal is formed by zeroing out the frequency component amplitude of the spectrum of the two-dimensional signal I+jQ within the unilateral notch bandwidth and its mirror frequency bandwidth, that is, there are notch signals at both sides of the frequency domain.

In some embodiments, the same notch processing may also be performed at the same frequency position on I-path and Q-path real signals of the two-dimensional signal to generate a bilateral notch signal.

The above method for generating the bilateral notch signal may also be applicable to a case where the nonlinear system is a coherent transmitter and/or a coherent receiver.

In some embodiments, for the case where the nonlinear system is a coherent receiver, filtering processing may be performed on a wideband optical source optical source by an optical wave shaper to directly generate a bilateral notch signal in an optical domain.

The method for generating the unilateral notch signal is as follows.

For example, a frequency component amplitude of a spectrum of a two-dimensional signal (i.e. a complex signal I+jQ) only within a unilateral notch bandwidth is zeroed out by transmitter digital signal processing.

Figure 3:
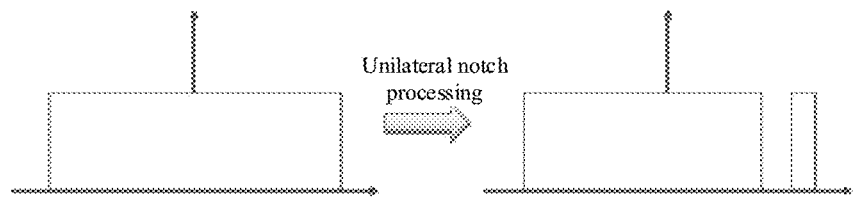
FIG. 3 is a schematic diagram of forming a unilateral notch signal in Embodiment 1 of this disclosure.

FIG. 3 is a schematic diagram of forming the unilateral notch signal in Embodiment 1 of this disclosure. As shown in FIG. 3, in the frequency domain, the frequency component amplitude of the spectrum of the two-dimensional signal I+jQ only within the unilateral notch bandwidth is zeroed out by unilateral notch processing to form the unilateral notch signal, that is, there is a notch signal at one side of the frequency domain only.

The above method for generating the unilateral notch signal may be applicable to the case where the nonlinear system is a coherent transmitter and/or a coherent receiver.

In some embodiments, for the case where the nonlinear system is a coherent receiver, filtering processing may be performed on a wideband optical source optical source by an optical wave shaper to directly generate a unilateral notch signal in an optical domain.

In some embodiments, notch depths of the generated bilateral and unilateral notch signals are greater than or equal to a preset depth, such as greater than or equal to 25 dB; in addition, band widths (BWs) of the generated bilateral and unilateral notch signals are made greater than or equal to a preset width, for example, the preset width is a resolution bandwidth for measuring a power spectrum outputted by the nonlinear system. In this way, reliability of a measurement result may be guaranteed.

The method for generating the multi-tone signal is as follows.

In some embodiments, when the nonlinear system is a coherent transmitter, the multi-tone signal may be generated by transmitter digital signal processing. For example, the multi-tone signal may be expressed as $\Sigma_{k=1}^{n} A_k \cos(2\pi k f_0 t + \theta_k)$; where, $f_0$ is a frequency interval of the multi-tone signal, n is a total number of single-tone signals, n is a positive integer, k is an index of the multi-tone signal, $A_k$ is an amplitude of a k-th single-tone signal, and $\theta_k$ is an initial phase of the k-th single-tone signal.

In addition, for the case where the nonlinear system is a coherent receiver, the multi-tone signal may be generated by transmitter digital signal processing, and then the multi-tone signal is converted from an electrical domain to the optical domain by a coherent transmitter.

Or, the multi-tone signal may be generated directly in the optical domain by an optical comb generator. The multi-tone signal may be expressed as $\Sigma_{k=0}^{n-1} A_k e^{j(2\pi(f_m + k f_0)t + \theta_k)}$; where, $f_m$ is a minimum frequency of the multi-tone signal, $f_0$ is a frequency interval of the multi-tone signal, n is a total number of single-tone signals, n is a positive integer, k is an index of the multi-tone signal, $A_k$ is an amplitude of a k-th single-tone signal, and $\theta_k$ is an initial phase of the k-th single-tone signal.

In some embodiments, the frequency interval of the multi-tone signal is greater than or equal to a band bandwidth of the unilateral notch signal or the bilateral notch signal, and peak-to-average power ratios (PAPRs) of the multi-tone signal and the unilateral notch signal or the bilateral notch signal are made close to each other by adjusting initial phases of different single-tone signals. In this way, accuracy of a measurement result may further be improved.

In some embodiments, in the case where the nonlinear system is a coherent receiver and the signal is generated by the coherent transmitter, as the coherent transmitter also contains IQ imbalance, an additive Gaussian white noise and a nonlinear noise, in generating the bilateral notch signal, unilateral notch signal and multi-tone signal by using the coherent transmitter, the coherent transmitter is calibrated first to eliminate its impact on the measurement result.

In some embodiments, when the nonlinear system is a coherent receiver, a local oscillator (LO) frequency of the coherent receiver is adjusted to minimize a frequency difference between the LO frequency and a carrier frequency of an input multi-tone signal. In addition, the coherent transmitter and the optical frequency comb generator may be made to use the same light source as the coherent receiver, so as to achieve homodyne detection.

In some embodiments, statistical characteristics of the generated bilateral notch signal, unilateral notch signal and multi-tone signal are made close to each other, thereby further improving the accuracy of the measurement result.

In some embodiments, the bilateral notch signal and the unilateral notch signal are isospectral equiprobability signals. In this way, the accuracy of the measurement result may further be improved.

In some embodiments, the power spectrum of the signal outputted by the nonlinear system is measured by respectively inputting the generated bilateral notch signal, unilateral notch signal and multi-tone signal into the nonlinear system to be measured, thereby obtaining the first power-to-noise ratio, the second power-to-noise ratio and the power of the additive Gaussian white noise of the nonlinear system. A specific measurement process shall be illustrated below.

In step 102, the first power-to-noise ratio of the nonlinear system is measured by using the generated bilateral notch signal.

Figure 4:
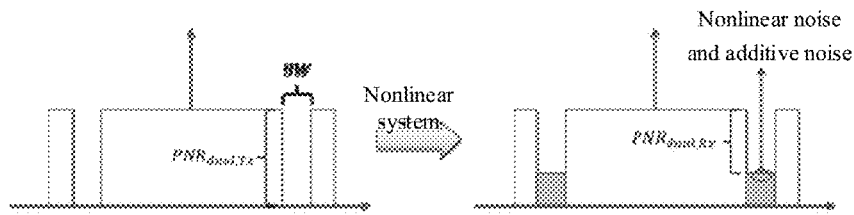
FIG. 4 is a schematic diagram of a power spectrum of the bilateral notch signal after passing through a nonlinear system in Embodiment 1 of this disclosure.

FIG. 4 is a schematic diagram of the power spectrum of the bilateral notch signal after passing through the nonlinear system in Embodiment 1 of this disclosure.

As shown in FIG. 4, the nonlinear effect of the nonlinear system may cause an input signal to generate a new frequency component, which may be observed within the band width. As a nonlinear noise and an additive white Gaussian noise (AWGN) are unable to be directly distinguished in spectra, average power $P_{dual\ noise}(f)$ measured within the bilateral notch bandwidth is a sum of nonlinear noise power and additive white Gaussian noise power. In addition, BW denotes the band width, $PNR_{dualTx}(f)$ denotes the power-to-noise ratio of the input signal of the nonlinear system, and $PNR_{dual,Rx}(f)$ denotes the power-to-noise ratio of the output signal of the nonlinear system.

For example, the power-to-noise ratio of the output signal of the nonlinear system, i.e. the first power-to-noise ratio, in case of inputting a bilateral notch signal, may be calculated according to the following formula (1):

$$PNR_{dual,Rx}(f) = \frac{P_{dual\ signal}(f)}{P_{dual\ noise}(f)} = \frac{(P(f)_{f\in B_{signal}})}{(P(f)_{f\in B_{noise}})}; \quad (1)$$

where, f is the frequency, P(f) is the measured signal power spectrum, $PNR_{dual,Rx}(f)$ denotes the power-to-noise ratio of the output signal of the nonlinear system, i.e. the first power-to-noise ratio, in case of inputting a bilateral notch signal, $P_{dual\ signal}(f)$ denotes average power of a signal adjacent to the band width, $\langle\cdot\rangle$ is an averaging operation, $B_{signal}=[f_c-5BW/4, f_c-3BW/4]\cup [f_c+3BW/4, f_c+5BW/4]$, which is a calculated bandwidth of $P_{dual\ signal}(f)$, $B_{noise}=[f_c-BW/4, f_c+BW/4]$, which is a calculated bandwidth of $P_{dual\ noise}(f)$, $f_c$ is notch center frequency, and BW is the band width.

In step 103, the second power noise ratio of the nonlinear system is measured by using the generated unilateral notch signal.

Figure 5:
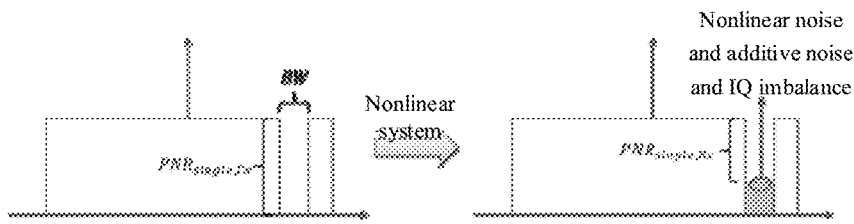
FIG. 5 is a schematic diagram of a power spectrum of the unilateral notch signal after passing through the nonlinear system in Embodiment 1 of this disclosure.

FIG. 5 is a schematic diagram of a power spectrum of the unilateral notch signal after passing through the nonlinear system in Embodiment 1 of this disclosure.

As shown in FIG. 5, IQ imbalance in the nonlinear system may destroy a frequency domain condition of the unilateral notch. Therefore, the average power $P_{signal\ noise}(f)$ measured within the unilateral band width includes not only nonlinear noise power and additive Gaussian white noise power, but also contribution of the IQ imbalance. In addition, BW denotes the band width, $P_{single,Tx}(f)$ denotes the power-to-noise ratio of the input signal of the nonlinear system, and $PNR_{single,Rx}(f)$ denotes the power-to-noise ratio of the output signal of the nonlinear system.

For example, the power-to-noise ratio of the output signal of the nonlinear system, i.e. the second power-to-noise ratio, may be calculated according to the following formula (2) in case of inputting a single notch signal:

$$PNR_{single,Rx}(f) = \frac{P_{single\ signal}(f)}{P_{single\ noise}(f)} = \frac{(P(f)_{f\in B_{signal}})}{(P(f)_{f\in B_{noise}})}; \quad (2)$$

where, f is a frequency, P(f) is the measured signal power spectrum, $PNR_{single,Rx}(f)$ denotes the power-to-noise ratio of the output signal of the nonlinear system, i.e. the second power-to-noise ratio, in case of inputting a single notch signal, $P_{single\ signal}(f)$ denotes signal average power adjacent to the band width, $\langle\cdot\rangle$ is an averaging operation, $B_{signal}=[f_c-5BW/4, f_c-3BW/4]\cup[f_c+3BW/4, f_c+5BW/4]$, which is a calculated bandwidth of $P_{single\ signal}(f)$, $B_{noise}=[f_c-BW/4, f_c+BW/4]$, which is a calculated bandwidth of $P_{single\ noise}(f)$, $f_c$ is a notch center frequency, and BW is the band width.

In some embodiments, the first power-to-noise ratio and the second power-to-noise ratio are calibrated when a notch depth of the bilateral notch signal or the unilateral notch signal is less than or equal to a preset threshold. For example, the preset threshold is 25 dB.

For example, calibration may be performed according to the following formulae (3) and (4):

$$\frac{1}{PNR_{dual,Rx}(f)} = \frac{1}{PNR_{dual,Rx}(f)} - \frac{1}{PNR_{dual,Tx}(f)}, \quad (3)$$

$$\frac{1}{PNR_{single,Rx}(f)} = \frac{1}{PNR_{single,Rx}(f)} - \frac{1}{PNR_{single,Tx}(f)}; \quad (4)$$

where, $PNR_{dual,Rx}(f)$ and $PNR_{single,Rx}(f)$ to the left of the equal sign respectively denote the first power-to-noise ratio and second power-to-noise ratio after being calibrated, $PNR_{dual,Rx}(f)$ and $PNR_{single,Rx}(f)$ to the right of the equal sign respectively denote the first power-to-noise ratio and second power-to-noise ratio before being calibrated, $PNR_{dual,Tx}(f)$ and $PNR_{single,Tx}(f)$ respectively denote the power-to-noise ratio of the bilateral notch signal and the power-to-noise ratio of the unilateral notch signal inputted into the nonlinear system.

In step 104, the power of the additive Gaussian white noise of the nonlinear system is measured by using the generated multi-tone signal.

Figure 6:
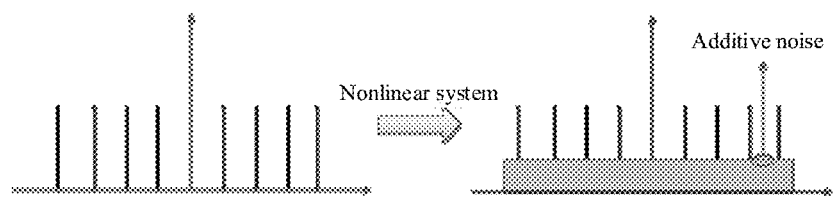
FIG. 6 is a schematic diagram of a power spectrum of a multi-tone signal after passing through the nonlinear system in Embodiment 1 of this disclosure.

FIG. 6 is a schematic diagram of a power spectrum of the multi-tone signal after passing through the nonlinear system in Embodiment 1 of this disclosure.

As shown in FIG. 6, nonlinearity may cause signal to generate harmonic distortion (HD) and intermodulation distortion (IMD). As frequency intervals of a multi-tone signal are equal, its harmonic distortion and intermodulation distortion have the same frequency as an original multi-tone signal, hence, a frequency component between multi-tone signals is an additive Gaussian white noise.

For example, the power of the additive Gaussian white noise of the output signal of the nonlinear system in case of inputting a multi-tone signal may be calculated according to the following formula (5):

$$P_{AWGN}(f)=(P(f)_{f\in B_{noise}}) \quad (5);$$

where, $P_{AWGN}(f)$ denotes the power of the additive Gaussian white noise, f is the frequency, P(f) is the measured signal power spectrum, $\langle\cdot\rangle$ is an averaging operation, $B_{noise}=[f_c-BW/4, f_c+BW/4]$, which is a calculated bandwidth of $P_{AWGN}(f)$, $f_c$ is a notch center frequency, and BW is the band width.

In some embodiments, the signal power spectrum of the output signal of the nonlinear system may be measured by a spectrometer; or, the signal power spectrum may also be calculated through fast Fourier transform in receiver digital signal processing; and furthermore, when a receiver is used, as the coherent receiver also contains IQ imbalance, an additive Gaussian white noise and a nonlinear noise, it is needed to calibrate the coherent receiver before calculating the above power value by using the coherent receiver, so as to eliminate its impact on a measurement result.

In step 105, the nonlinear power-to-noise ratio of the nonlinear system and the power-to-noise ratio introduced by IQ imbalance are calculated according to the measured power of the additive Gaussian white noise, the first power-to-noise ratio and the second power-to-noise ratio. A specific calculation process shall be illustrated below.

Figure 7:
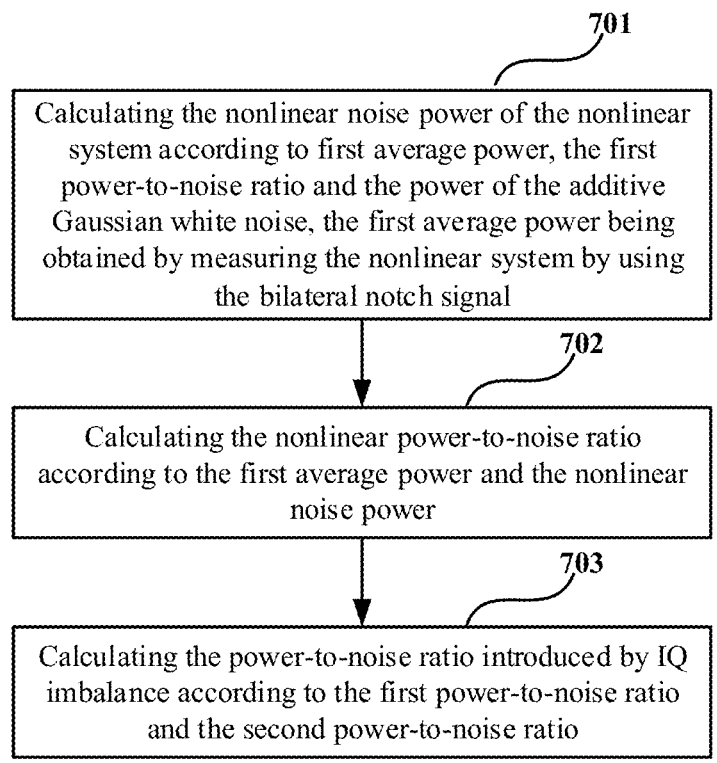
FIG. 7 is a schematic diagram of a method for executing step 105 in Embodiment 1 of this disclosure.

FIG. 7 is a schematic diagram of a method for executing step 105 in Embodiment 1 of this disclosure. As shown in FIG. 7, the method includes:

step 701: calculating the nonlinear noise power of the nonlinear system according to first average power, the first power-to-noise ratio and the power of the additive Gaussian white noise, the first average power being obtained by measuring the nonlinear system by using the bilateral notch signal;

step 702: calculating the nonlinear power-to-noise ratio according to the first average power and the nonlinear noise power; and step 703: calculating the power-to-noise ratio introduced by IQ imbalance according to the first power-to-noise ratio and the second power-to-noise ratio.

In step 701, the first average power is signal average power adjacent to the band width measured in measuring the nonlinear system by using the bilateral notch signal.

For example, the nonlinear noise power of the nonlinear system may be calculated according to the following formula (6):

$$P_{NL}(f) = \frac{P_{dual\,signal}(f)}{PNR_{dual,Rx}(f)} - P_{AWGN}(f); \quad (6)$$

where, $P_{NL}(f)$ denotes the nonlinear noise power, $P_{dual\,signal}(f)$ denotes the first average power, i.e. the signal average power adjacent to the band width measured in measuring the nonlinear system by using the bilateral notch signal, $P_{AWGN}(f)$ denotes the power of the additive Gaussian white noise, $PNR_{dual,Rx}(f)$ denotes the first power-to-noise ratio, and f is the frequency.

In step 702, the nonlinear power-to-noise ratio is calculated according to the first average power and the nonlinear noise power. For example, the nonlinear power-to-noise ratio of the nonlinear system may be calculated according to the following formula (7):

$$PNR_{NL}(f) = \frac{P_{dual\,signal}(f)}{P_{NL}(f)}; \quad (7)$$

where, $PNR_{NL}(f)$ denotes the nonlinear power-to-noise ratio, $P_{dual\,signal}(f)$ denotes the first average power, i.e. the signal average power adjacent to the band width measured in measuring the nonlinear system by using the bilateral notch signal, and $P_{NL}(f)$ denotes the nonlinear noise power.

In step 703, the power-to-noise ratio introduced by the IQ imbalance may be calculated according to the first power-to-noise ratio and the second power-to-noise ratio. For example, the power-to-noise ratio of the nonlinear system introduced by the IQ imbalance may be calculated according to the following formula (8):

$$\frac{1}{PNR_{IQimb}(f)} = \frac{1}{PNR_{single,Rx}(f)} - \frac{1}{PNR_{dual,Rx}(f)}; \quad (8)$$

where, $PNR_{IQ\,imb}(f)$ denotes the power-to-noise ratio introduced by the IQ imbalance, $PNR_{dual,Rx}(f)$ and $PNR_{single,Rx}(f)$ respectively denote the first power-to-noise ratio and the second power-to-noise ratio, and f is the frequency.

In addition, in some embodiments, operations in formulae (1)-(8) are executed in linear units.

It can be seen from the above embodiment that the power of the additive Gaussian white noise, the first power-to-noise ratio and the second power-to-noise ratio of the nonlinear system may respectively be measured by using the multi-tone signal, bilateral notch signal and unilateral notch signal, and the nonlinear power-to-noise ratio of the nonlinear system and the power-to-noise ratio introduced by IQ imbalance may be calculated according to the power of the additive Gaussian white noise, the first power-to-noise ratio and the second power-to-noise ratio, thereby separating the nonlinear noise, IQ imbalance and additive white Gaussian noise of the nonlinear system, and accurately measuring relevant parameters.

Embodiment 2

The embodiment of this disclosure provides a method for estimating performance of a nonlinear system.

Figure 8:
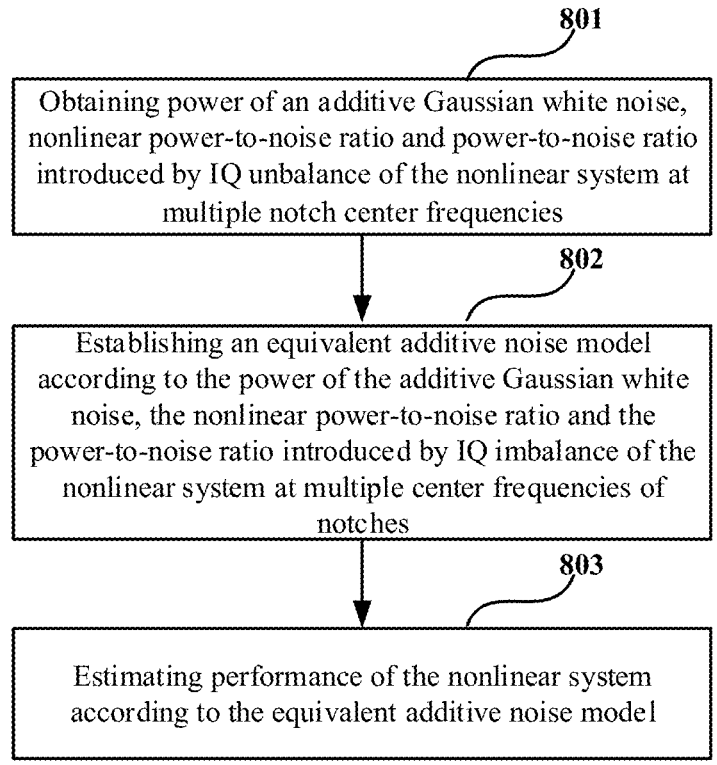
FIG. 8 is a schematic diagram of the method for estimating performance of a nonlinear system of Embodiment 2 of this disclosure.

FIG. 8 is a schematic diagram of the method for estimating performance of a nonlinear system of Embodiment 2 of this disclosure. As shown in FIG. 8, the method includes:

step 801: obtaining power of an additive Gaussian white noise, nonlinear power-to-noise ratio and power-to-noise ratio introduced by IQ unbalance of the nonlinear system at multiple notch center frequencies in the method for measuring nonlinear system noises described in Embodiment 1;

step 802: establishing an equivalent additive noise model according to the power of the additive Gaussian white noise, the nonlinear power-to-noise ratio and the power-to-noise ratio introduced by IQ imbalance of the nonlinear system at multiple center frequencies of notches; and step 803: estimating performance of the nonlinear system according to the equivalent additive noise model.

According to the disclosure contained in Embodiment 1, the obtained power of additive Gaussian white noise, nonlinear power-to-noise ratio and power-to-noise ratio introduced by IQ imbalance of the nonlinear system correspond to the frequency, which corresponds to the center frequency of the notch. By changing the center frequency of the notch and repeating the method described in Embodiment 1, power of additive Gaussian white noises, nonlinear power-to-noise ratios and nonlinear power-to-noise ratios introduced by IQ imbalance of the nonlinear system at multiple center frequencies of the notch may be obtained.

In step 802, the equivalent additive noise model is established according to the power of additive Gaussian white noises, nonlinear power-to-noise ratios and nonlinear power-to-noise ratios introduced by IQ imbalance of the nonlinear system at multiple center frequencies of the notch.

Figure 9:
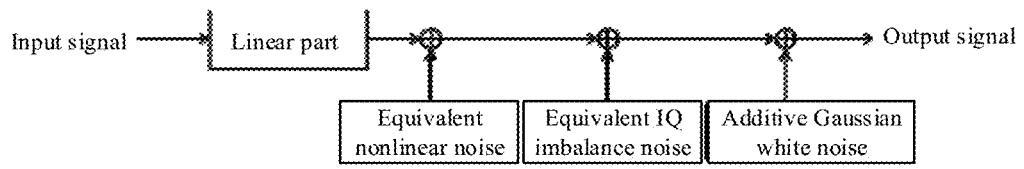
FIG. 9 is a schematic diagram of an equivalent additive noise model of Embodiment 2 of this disclosure.

FIG. 9 is a schematic diagram of the equivalent additive noise model of Embodiment 2 of this disclosure. As shown in FIG. 9, the equivalent additive noise model includes a linear part, an equivalent nonlinear noise part, an equivalent IQ imbalance noise part and an additive Gaussian white noise part.

A specific method for establishing the equivalent additive noise model according to the power of additive Gaussian white noises, nonlinear power-to-noise ratios and nonlinear power-to-noise ratios introduced by IQ imbalance of the nonlinear system at multiple center frequencies of the notch shall be illustrated below.

In some embodiments, a signal that is not notch processed is taken as the input signal of the nonlinear system, the output signal of the nonlinear system is measured, and a difference spectrum between the power spectrum of the output signal and the power spectrum of the input signal of the nonlinear system is the linear part of the model.

Furthermore, additional processing may be performed on the linear portion. For example, a frequency is selected, a linear part smaller than the frequency is reserved, and a linear part larger than the frequency is made flat.

In some embodiments, a signal that is not notch processed is taken as the input signal of the nonlinear system, and the output signal of the nonlinear system is measured; power of the output signal power spectrum at multiple notch center frequencies is calculated, and a corresponding nonlinear power-to-noise ratio is subtracted to obtain the nonlinear noise power at multiple notch center frequencies; then a certain frequency is selected, and interpolation is performed on the nonlinear noise power at multiple notch center frequencies to obtain the nonlinear noise power spectra at the frequencies; furthermore, a part of the output signal power spectrum of the nonlinear system higher than the frequencies is reserved, and the two are spliced together to form a complete nonlinear noise power spectrum; and finally, a seed noise with a certain probability distribution (such as Gaussian distribution or other distribution) and having a unit power spectral density is generated, and the equivalent nonlinear noise part in the model may be obtained by performing filtering by using the above nonlinear noise power spectrum.

In some embodiments, a signal that is not notch processed is taken as the input signal of the nonlinear system, and the output signal of the nonlinear system is measured; the power of the output signal power spectrum at multiple notch center frequencies are calculated, and a corresponding power-to-noise ratio introduced by IQ imbalance is subtracted to obtain IQ imbalance noise power at multiple notch center frequencies; a certain frequency is selected, and interpolation is performed on the IQ imbalance noise power at multiple notch center frequencies to obtain an IQ imbalance noise power spectrum smaller than the frequencies; a power spectrum larger than the frequencies are zeroed out to obtain a complete IQ imbalance noise power spectrum; and finally, a seed noise having a certain probability distribution (such as Gaussian distribution or other distribution) and having a unit power spectral density is generated, and the equivalent IQ imbalance noise part in the model may be obtained by performing filtering by using the above nonlinear noise power spectrum.

In some embodiments, a power spectral density ($P_{AWGN}(f)$) of the additive Gaussian white noise is calculated according to the power of the additive Gaussian white noise of the nonlinear system at multiple notch center frequencies, and an all-pass filter is generated by using a value thereof and is taken as the power spectrum of the additive Gaussian white noise; additional processing may be performed on the power spectrum of the additive Gaussian white noise, such as selecting a certain frequency and zeroing out a power spectrum of the additive Gaussian white noise higher than the frequencies; and finally, an additive Gaussian white noise with a unit power spectral density is generated and filtered by using the above additive Gaussian white noise power spectrum to obtain the additive Gaussian white noise part of the model.

After the establishment of the equivalent additive noise model, in step 803, the performance of the nonlinear system is estimated according to the equivalent additive noise model.

In some embodiments, the performance of a nonlinear system may be evaluated by taking a normal communication signal as an input signal of the model and calculating a bit error rate (BER) of an output signal of the model.

In some embodiments, a bit error rate to which one or more noises in the nonlinear system correspond may be evaluated by selectively turning on or off one or more noises in the model.

It can be seen from the above embodiment that by obtaining the power of the additive Gaussian white noise of nonlinear system, the nonlinear power-to-noise ratio and the power-to-noise ratio introduced by IQ imbalance at multiple notch center frequencies, the equivalent additive noise model may be established, and the performance of the nonlinear system may be flexibly and accurately estimated according to the equivalent additive noise model.

Embodiment 3

Embodiment 3 of this disclosure provides an apparatus for measuring nonlinear system noises. As a principle of the apparatus for solving problems is similar to that of the method of Embodiment 1, reference may be made to the implementation of the method described in Embodiment 1 for implementation of the apparatus, with identical or related contents being not going to be repeated herein any further.

Figure 10:
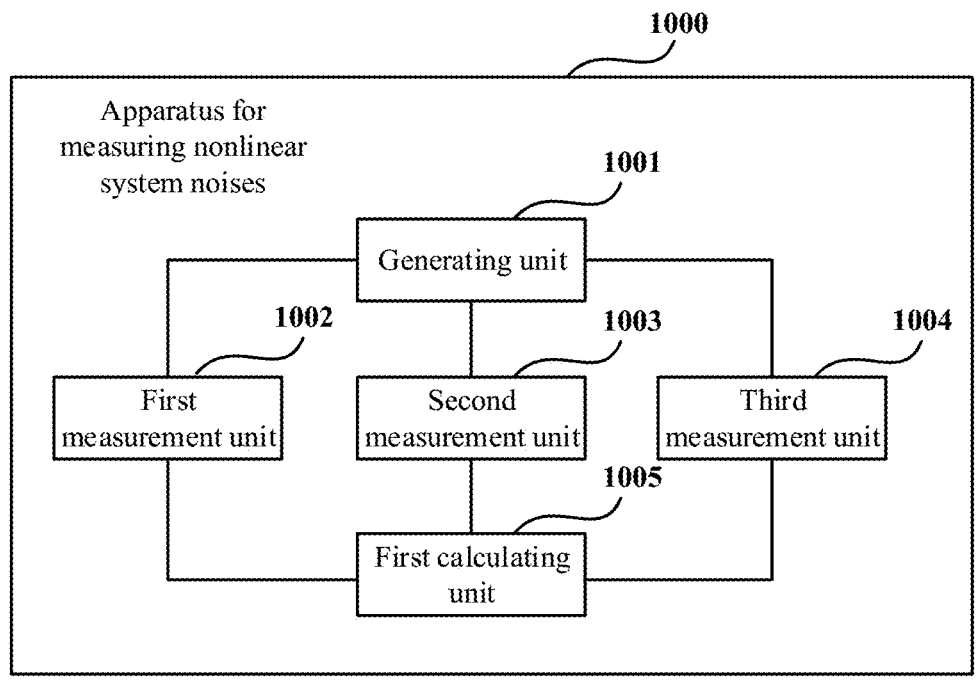
FIG. 10 is a schematic diagram of the apparatus for measuring nonlinear system noises of Embodiment 3 of this disclosure.

FIG. 10 is a schematic diagram of the apparatus for measuring nonlinear system noises of Embodiment 3 of this disclosure. As shown in FIG. 10, an apparatus 1000 for measuring nonlinear system noises includes:

a generating unit 1001 configured to generate a bilateral notch signal, a unilateral notch signal and a multi-tone signal;

a first measurement unit 1002 configured to measure power of an additive Gaussian white noise of a nonlinear system by using the multi-tone signal;

a second measurement unit 1003 configured to measure a first power-to-noise ratio of the nonlinear system by using the bilateral notch signal;

a third measurement unit 1004 configured to measure a second power-to-noise ratio of the nonlinear system by using the unilateral notch signal; and a first calculating unit 1005 configured to calculate a nonlinear power-to-noise ratio of the nonlinear system and a power-to-noise ratio introduced by IQ imbalance according to the power of the additive Gaussian white noise, the first power-to-noise ratio and the second power-to-noise ratio.

Figure 11:
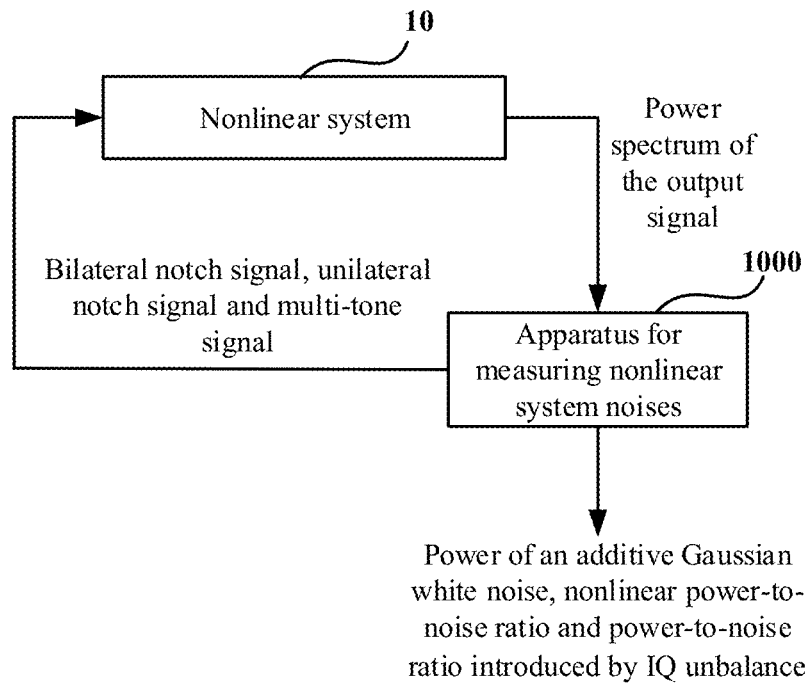
FIG. 11 is a schematic diagram of performing measurement by using the apparatus for measuring nonlinear system noises of Embodiment 3 of this disclosure.

FIG. 11 is a schematic diagram of performing measurement by using the apparatus for measuring nonlinear system noises of Embodiment 3 of this disclosure. As shown in FIG. 11, an apparatus 1000 for measuring nonlinear system noises inputs the generated bilateral notch signal, unilateral notch signal and multi-tone signal into a nonlinear system 10 to be measured, and the apparatus 1000 for measuring calculates power of an additive Gaussian white noise of the nonlinear system, a nonlinear power-to-noise ratio and a power-to-noise ratio introduced by IQ imbalance according to the measured power spectrum of the output signal of the nonlinear system 10.

Figure 12:
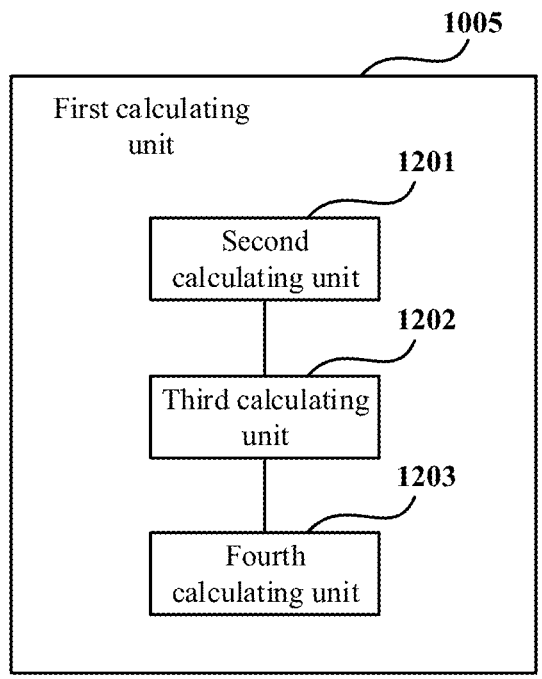
FIG. 12 is a schematic diagram of a first calculating unit of Embodiment 3 of this disclosure.

FIG. 12 is a schematic diagram of the first calculating unit of Embodiment 3 of this disclosure. As shown in FIG. 12, the first calculating unit 1005 includes:

a second calculating unit 1201 configured to calculate the nonlinear noise power of the nonlinear system according to first average power, the first power-to-noise ratio and the power of the additive Gaussian white noise, the first average power being obtained by measuring the nonlinear system by using the bilateral notch signal;

a third calculating unit 1202 configured to calculate the nonlinear power-to-noise ratio according to the first average power and the nonlinear noise power; and a fourth calculating unit 1203 configured to calculate the power-to-noise ratio introduced by IQ imbalance according to the first power-to-noise ratio and the second power-to-noise ratio.

Reference may be made to contents of related steps in Embodiment 1 for specific functions of the units in this embodiment, which shall not be repeated herein any further.

It can be seen from the above embodiment that the power of the additive Gaussian white noise, the first power-to-noise ratio and the second power-to-noise ratio of the nonlinear system may respectively be measured by using the multi-tone signal, bilateral notch signal and unilateral notch signal, and the nonlinear power-to-noise ratio of the nonlinear system and the power-to-noise ratio introduced by IQ imbalance may be calculated according to the power of the additive Gaussian white noise, the first power-to-noise ratio and the second power-to-noise ratio, thereby separating the nonlinear noise, IQ imbalance and additive white Gaussian noise of the nonlinear system, and accurately measuring relevant parameters.

Embodiment 4

Embodiment 4 of this disclosure provides an apparatus for estimating performance of a nonlinear system. As a principle of the apparatus for solving problems is similar to that of the method of Embodiment 2, reference may be made to the implementation of the method described in Embodiment 2 for implementation of the apparatus, with identical or related contents being not going to be repeated herein any further.

Figure 13:
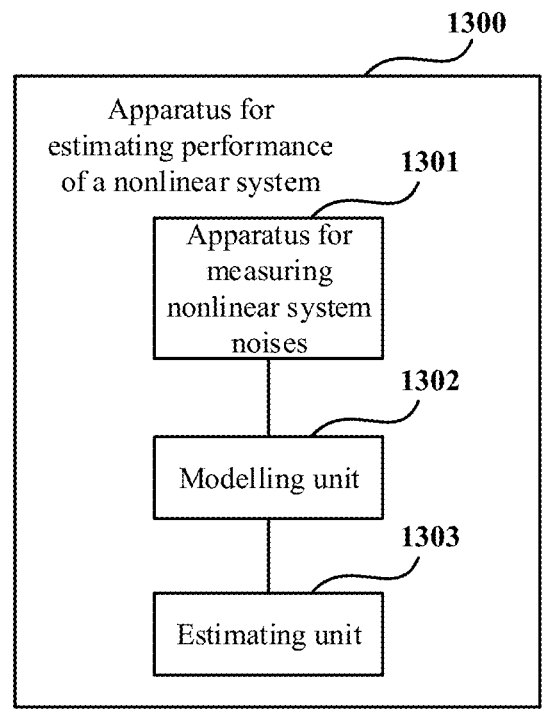
FIG. 13 is a schematic diagram of the apparatus for estimating performance of a nonlinear system of Embodiment 4 of this disclosure.

FIG. 13 is a schematic diagram of the apparatus for estimating performance of a nonlinear system of Embodiment 4 of this disclosure. As shown in FIG. 13, an apparatus 1300 for estimating performance of a nonlinear system includes:

an apparatus for measuring nonlinear system noises 1301 configured to obtain power of an additive Gaussian white noise, nonlinear power-to-noise ratio and power-to-noise ratio introduced by IQ unbalance of the nonlinear system at multiple notch center frequencies;

a modelling unit 1302 configured to establish an equivalent additive noise model according to the power of the additive Gaussian white noise, the nonlinear power-to-noise ratio and the power-to-noise ratio introduced by IQ imbalance of the nonlinear system at multiple center frequencies of notches, and an estimating unit 1303 configured to estimate performance of the nonlinear system according to the equivalent additive noise model.

The apparatus for measuring nonlinear system noises 1301 is identical to that contained in Embodiment 2, which shall not be described herein any further.

It can be seen from the above embodiment that by obtaining the power of the additive Gaussian white noise of nonlinear system, the nonlinear power-to-noise ratio and the power-to-noise ratio introduced by IQ imbalance at multiple notch center frequencies, the equivalent additive noise model may be established, and the performance of the nonlinear system may be flexibly and accurately estimated according to the equivalent additive noise model.

Embodiment 5

Figure 14:
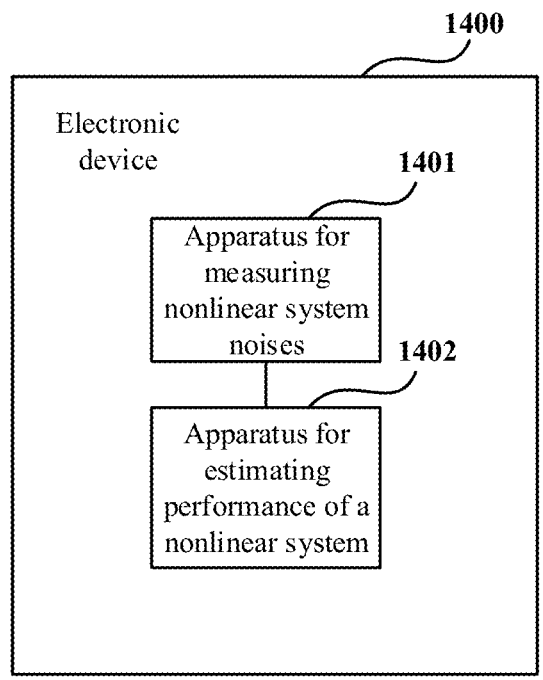
FIG. 14 is a schematic diagram of the electronic device of Embodiment 5 of this disclosure.

The embodiment of this disclosure provides an electronic device. FIG. 14 is a schematic diagram of the electronic device of Embodiment 5 of this disclosure. As shown in FIG. 14, an electronic device 1400 includes an apparatus 1401 for measuring nonlinear system noises and/or an apparatus 1402 for estimating performance of a nonlinear system. A structure and function of the apparatus 1401 for measuring nonlinear system noises are identical to those described in Embodiment 3, and a structure and function of the apparatus 1402 for estimating performance of a nonlinear system are identical to those described in Embodiment 4, which shall not be described herein any further.

Figure 15:
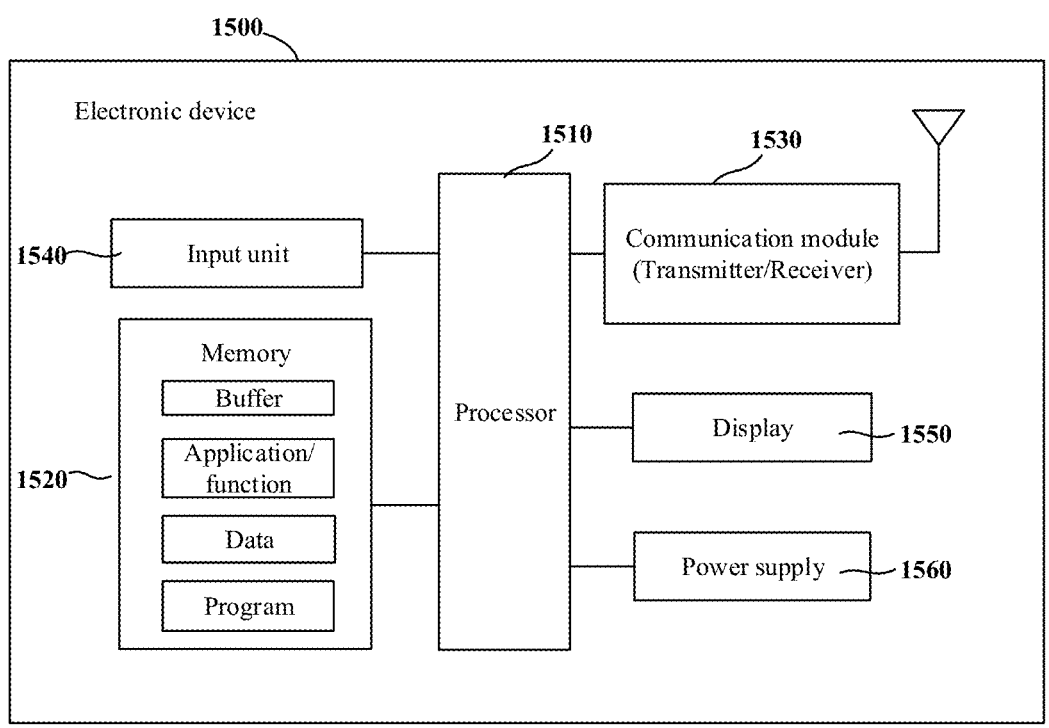
FIG. 15 is a block diagram of a systematic structure of the electronic device of Embodiment 5 of this disclosure.

FIG. 15 is a block diagram of a systematic structure of the electronic device of Embodiment 5 of this disclosure. As shown in FIG. 15, an electronic device 1500 may include a processor 1501 and a memory 1502, the memory 1502 being coupled to the processor 1501. This figure is illustrative only, and other types of structures may also be used, so as to supplement or replace this structure and achieve a telecommunications function or other functions.

As shown in FIG. 15, the electronic device 1500 may further include an input unit 1503, a display 1504 and a power supply 1505.

In one implementation, the functions of the apparatus for measuring nonlinear system noises described in Embodiment 3 may be integrated into the processor 1501. The processor 1501 may be configured to: generate a bilateral notch signal, a unilateral notch signal and a multi-tone signal; measure power of an additive Gaussian white noise of a nonlinear system by using the multi-tone signal; measure a first power-to-noise ratio of the nonlinear system by using the bilateral notch signal; measure a second power-to-noise ratio of the nonlinear system by using the unilateral notch signal; and calculate a nonlinear power-to-noise ratio of the nonlinear system and a power-to-noise ratio introduced by IQ imbalance according to the power of the additive Gaussian white noise, the first power-to-noise ratio and the second power-to-noise ratio.

For example, the generating a bilateral notch signal includes: zeroing out a frequency component amplitude of a spectrum of a two-dimensional signal in a bilateral notch bandwidth and its mirror frequency bandwidth via transmitter digital signal processing, or performing identical notch processing at identical frequency positions.

For example, when the nonlinear system is a coherent receiver, the generating a bilateral notch signal further includes: performing filtering processing on a wideband optical source optical source by an optical wave shaper to directly generate a bilateral notch signal in an optical domain.

For example, the generating a unilateral notch signal includes: zeroing out a frequency component amplitude of a spectrum of a two-dimensional signal only within a unilateral notch bandwidth by transmitter digital signal processing.

For example, when the nonlinear system is a coherent receiver, the generating a unilateral notch signal further includes: performing filtering processing on a wideband optical source optical source by an optical wave shaper to directly generate a unilateral notch signal in an optical domain.

For example, the generating a multi-tone signal includes: generating the multi-tone signal via transmitter digital signal processing, wherein a frequency interval of the multi-tone signal is greater than or equal to a notch bandwidth of the unilateral notch signal or the bilateral notch signal, and the multi-tone signal is generated by adjusting initial phases of different single-tone signals so that a peak-to-average power ratio (PAPR) of the multi-tone signal is close to that of the unilateral notch signal or the bilateral notch signal.

For example, the calculating a nonlinear power-to-noise ratio of the nonlinear system and a power-to-noise ratio introduced by IQ imbalance according to the power of the additive Gaussian white noise, the first power-to-noise ratio and the second power-to-noise ratio includes: calculating the nonlinear noise power of the nonlinear system according to first average power, the first power-to-noise ratio and the power of the additive Gaussian white noise, the first average power being obtained by measuring the nonlinear system by using the bilateral notch signal; calculating the nonlinear power-to-noise ratio according to the first average power and the nonlinear noise power; and calculating the power-to-noise ratio introduced by IQ imbalance according to the first power-to-noise ratio and the second power-to-noise ratio.

For example, in the process of measuring the power of the additive Gaussian white noise, the first power-to-noise ratio and the second power-to-noise ratio, power outputted by the nonlinear system is measured by a spectrometer; or, a receive signal power spectrum is calculated through fast Fourier transform in digital signal processing, so as to calculate the power.

For example, the first power-to-noise ratio and the second power-to-noise ratio are calibrated when a notch depth of the bilateral notch signal or the unilateral notch signal is less than or equal to a preset threshold.

For example, the bilateral notch signal and the unilateral notch signal are isospectral equiprobability signals.

In another implementation, the functions of the apparatus for estimating performance of a nonlinear system described in Embodiment 4 may be integrated into the processor 1501. The processor 1501 may be configured to: obtain power of an additive Gaussian white noise, nonlinear power-to-noise ratio and power-to-noise ratio introduced by IQ unbalance of the nonlinear system at multiple notch center frequencies; establish an equivalent additive noise model according to the power of the additive Gaussian white noise, the nonlinear power-to-noise ratio and the power-to-noise ratio introduced by IQ imbalance of the nonlinear system at multiple center frequencies of notches, and estimate performance of the nonlinear system according to the equivalent additive noise model.

Furthermore, the functions of the apparatus for measuring nonlinear system noises described in Embodiment 3 or the apparatus for estimating performance of a nonlinear system described in Embodiment 4 and the processor 1501 may be configured separately. For example, the apparatus for measuring nonlinear system noises or the apparatus for estimating performance of a nonlinear system may be configured as a chip connected to the processor 1501, and the function of the apparatus for measuring nonlinear system noises or the apparatus for estimating performance of a nonlinear system may be implemented under control of the processor 1501.

In this embodiment, the electronic device 1500 does not necessarily include all components shown in FIG. 15.

As shown in FIG. 15, the processor 1501 is sometimes referred to as a controller or an operational control, which may include a microprocessor or other processor devices and/or logic devices. The processor 1501 receives input and controls operations of components of the electronic device 1500.

The memory 1502 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 1501 may execute programs stored in the memory 1502, so as to realize information storage or processing, etc. Functions of other parts are similar to those of the related art, which shall not be described herein any further. The parts of the terminal equipment 1500 may be realized by specific hardware, firmware, software, or any combination thereof, without departing from the scope of this disclosure.

In this embodiment, the electronic device may be a stand-alone device, such as a stand-alone computer, or, it may also be integrated in an optical receiver.

It can be seen from the above embodiment that the power of the additive Gaussian white noise, the first power-to-noise ratio and the second power-to-noise ratio of the nonlinear system may respectively be measured by using the multi-tone signal, bilateral notch signal and unilateral notch signal, and the nonlinear power-to-noise ratio of the nonlinear system and the power-to-noise ratio introduced by IQ imbalance may be calculated according to the power of the additive Gaussian white noise, the first power-to-noise ratio and the second power-to-noise ratio, thereby separating the nonlinear noise, IQ imbalance and additive white Gaussian noise of the nonlinear system, and accurately measuring relevant parameters.

Furthermore, the power of the additive Gaussian white noise, the nonlinear power-to-noise ratio and the power-to-noise ratio introduced by IQ imbalance of the nonlinear system at multiple center frequencies of notches may be obtained according to the above methods, thereby establishing the equivalent additive noise model, and performance of the nonlinear system may be accurately estimated according to the equivalent additive noise model.

An embodiment of this disclosure provides a computer readable program, which, when executed in an apparatus for measuring nonlinear system noises or an electronic device, will cause a computer to carry out the method for measuring nonlinear system noises as described in Embodiment 1 in the apparatus for measuring nonlinear system noises or the electronic device.

An embodiment of this disclosure provides a computer readable medium, including a computer readable program, which will cause a computer to carry out the method for measuring nonlinear system noises as described in Embodiment 1 in an apparatus for measuring nonlinear system noises or an electronic device.

An embodiment of this disclosure provides a computer readable program, which, when executed in an apparatus for estimating performance of a nonlinear system or an electronic device, will cause a computer to carry out the method for estimating performance of a nonlinear system as described in Embodiment 2 in the apparatus for estimating performance of a nonlinear system or the electronic device.

An embodiment of this disclosure provides a computer readable medium, including a computer readable program, which will cause a computer to carry out the measurement method for estimating performance of a nonlinear system as described in Embodiment 2 in an apparatus for estimating performance of a nonlinear system or an electronic device.

The method for measuring nonlinear system noises executed in an apparatus for measuring nonlinear system noises or an electronic device described with reference to the embodiments of this disclosure may be directly embodied as hardware, software modules executed by a processor, or a combination thereof, for example, in form of one or more units. For example, one or more functional block diagrams and/or one or more combinations of the functional block diagrams shown FIG. 10 may either correspond to software modules of procedures of a computer program, or correspond to hardware modules. Such software modules may respectively correspond to the steps shown in FIG. 1. And the hardware module, for example, may be carried out by firming the soft modules by using a field programmable gate array (FPGA).

The software modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 10 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 10 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

According to the implementations disclosed in the embodiments of this disclosure, following supplements are further disclosed.

In an example, an apparatus may include a generating unit configured to generate a bilateral notch signal, a unilateral notch signal and a multi-tone signal; a first measurement unit configured to measure power of an additive Gaussian white noise of a nonlinear system by using the multi-tone signal; a second measurement unit configured to measure a first power-to-noise ratio of the nonlinear system by using the bilateral notch signal; a third measurement unit configured to measure a second power-to-noise ratio of the nonlinear system by using the unilateral notch signal; and a first calculating unit configured to calculate a nonlinear power-to-noise ratio of the nonlinear system and a power-to-noise ratio introduced by IQ imbalance according to the power of the additive Gaussian white noise, the first power-to-noise ratio and the second power-to-noise ratio.

In an example, the generating unit zeros out a frequency component amplitude of a spectrum of a two-dimensional signal in a bilateral notch bandwidth and its mirror frequency bandwidth via transmitter digital signal processing to generate a bilateral notch signal, or performs identical notch processing at identical frequency positions on real signals of I-path and Q-path of a two-dimensional signal to generate the bilateral notch signal.

In an example, when the nonlinear system is a receiver, the generating unit performs filtering processing on a broad-spectrum light source via an optical waveform editor to directly generate the bilateral notch signal in an optical domain.

In an example, the generating unit zeroes out the frequency component amplitude of the spectrum of the two-dimensional signal only within the bilateral notch bandwidth via transmitter digital signal processing to generate the unilateral notch signal.

In an example, when the nonlinear system is a receiver, the generating unit performs filtering processing on the broad-spectrum light source via the optical waveform editor to directly generate the unilateral notch signal in the optical domain.

In an example, the generating unit generates a multi-tone signal via transmitter digital signal processing, wherein a frequency interval of the multi-tone signal is greater than or equal to a notch bandwidth of the unilateral notch signal or the bilateral notch signal, and the multi-tone signal is generated by adjusting initial phases of different single-tone signals so that a peak-to-average power ratio (PAPR) of the multi-tone signal is close to that of the unilateral notch signal or the bilateral notch signal.

In an example, the first calculating unit may include a second calculating unit configured to calculate the nonlinear noise power of the nonlinear system according to first average power, the first power-to-noise ratio and the power of the additive Gaussian white noise, the first average power being obtained by measuring the nonlinear system by using the bilateral notch signal; a third calculating unit configured to calculate the nonlinear power-to-noise ratio according to the first average power and the nonlinear noise power; and a fourth calculating unit configured to calculate the power-to-noise ratio introduced by IQ imbalance according to the first power-to-noise ratio and the second power-to-noise ratio.

In an example, in the process of measuring the power of the additive Gaussian white noise, the first power-to-noise ratio and the second power-to-noise ratio, power output by the nonlinear system is measured by a spectrometer; or, a power spectrum of a receive signal is calculated through fast Fourier transform in digital signal processing, so as to calculate the power.

In an example, the apparatus may further include a calibrating unit configured to calibrate the first power-to-noise ratio and the second power-to-noise ratio when a notch depth of the bilateral notch signal or the unilateral notch signal is less than or equal to a preset threshold.

In an example, the bilateral notch signal and the unilateral notch signal are isospectral equiprobability signals.

In an example, an apparatus to estimate performance of a nonlinear system, may include the apparatus for measuring nonlinear system noises according to any one of above examples and configured to obtain power of an additive Gaussian white noise, nonlinear power-to-noise ratio and power-to-noise ratio introduced by IQ unbalance of the nonlinear system at multiple notch center frequencies; a modelling configured to establish an equivalent additive noise model according to the power of the additive Gaussian white noise, the nonlinear power-to-noise ratio and the power-to-noise ratio introduced by IQ imbalance of the nonlinear system at multiple center frequencies of notches; and an estimating configured to estimate performance of the nonlinear system according to the equivalent additive noise model.

In an example, an electronic device may include the apparatus as described in any one of above examples.

In an example, a method of measuring nonlinear system noises may include generating a bilateral notch signal, a unilateral notch signal and a multi-tone signal; measuring power of an additive Gaussian white noise of a nonlinear system by using the multi-tone signal; measuring a first power-to-noise ratio of the nonlinear system by using the bilateral notch signal; measuring a second power-to-noise ratio of the nonlinear system by using the unilateral notch signal; and calculating a nonlinear power-to-noise ratio of the nonlinear system and a power-to-noise ratio introduced by IQ imbalance according to the power of the additive Gaussian white noise, the first power-to-noise ratio and the second power-to-noise ratio.

In an example, the generating a bilateral notch signal may include zeroing out a frequency component amplitude of a spectrum of a two-dimensional signal in a bilateral notch bandwidth and its mirror frequency bandwidth via transmitter digital signal processing, or performing identical notch processing at identical frequency positions on real signals of I-path and Q-path of a two-dimensional signal.

In an example, when the nonlinear system is a receiver, the generating a bilateral notch signal further may include performing filtering processing on a broad-spectrum light source via an optical waveform editor to directly generate the bilateral notch signal in an optical domain.

In an example, the generating a unilateral notch signal may include zeroing out the frequency component amplitude of the spectrum of the two-dimensional signal only within the bilateral notch bandwidth via transmitter digital signal processing.

In an example, when the nonlinear system is a receiver, the generating a unilateral notch signal further may include performing filtering processing on the broad-spectrum light source via the optical waveform editor to directly generate the unilateral notch signal in the optical domain.

In an example, the generating a multi-tone signal may include generating a multi-tone signal via transmitter digital signal processing, wherein a frequency interval of the multi-tone signal is greater than or equal to a notch bandwidth of the unilateral notch signal or the bilateral notch signal, and the multi-tone signal is generated by adjusting initial phases of different single-tone signals so that a peak-to-average power ratio (PAPR) of the multi-tone signal is close to that of the unilateral notch signal or the bilateral notch signal.

In an example, the calculating a nonlinear power-to-noise ratio of the nonlinear system and a power-to-noise ratio introduced by IQ imbalance according to the power of the additive Gaussian white noise, the first power-to-noise ratio and the second power-to-noise ratio, may include calculating the nonlinear noise power of the nonlinear system according to first average power, the first power-to-noise ratio and the power of the additive Gaussian white noise, the first average power being obtained by measuring the nonlinear system by using the bilateral notch signal; calculating the nonlinear power-to-noise ratio according to the first average power and the nonlinear noise power; and calculating the power-to-noise ratio introduced by IQ imbalance according to the first power-to-noise ratio and the second power-to-noise ratio.

In an example, in the process of measuring the power of the additive Gaussian white noise, the first power-to-noise ratio and the second power-to-noise ratio, power outputted by the nonlinear system is measured by a spectrometer; or, a power spectrum of a receive signal is calculated through fast Fourier transform in digital signal processing, so as to calculate the power.

In an example, the method may further include calibrating the first power-to-noise ratio and the second power-to-noise ratio when a notch depth of the bilateral notch signal or the unilateral notch signal is less than or equal to a preset threshold.

In an example, the bilateral notch signal and the unilateral notch signal are isospectral equiprobability signals.

In an example, a method of estimating performance of a nonlinear system may include obtaining power of an additive Gaussian white noise, nonlinear power-to-noise ratio and power-to-noise ratio introduced by IQ unbalance of the nonlinear system at multiple notch center frequencies in the method for measuring nonlinear system noises as described in any one of the above examples; establishing an equivalent additive noise model according to the power of the additive Gaussian white noise, the nonlinear power-to-noise ratio and the power-to-noise ratio introduced by IQ imbalance of the nonlinear system at multiple center frequencies of notches; and estimating performance of the nonlinear system according to the equivalent additive noise model.

The invention claimed is:

1. An apparatus to measure nonlinear system noises, the apparatus comprising:
   a memory; and
   a processor coupled to the memory to control execution of
      a process to,
         generate a bilateral notch signal and a unilateral notch signal in which notch depths of the bilateral notch signal and the unilateral notch signal are greater than or equal to a preset depth,
         generate a multi-tone signal via transmitter digital signal processing, such that a frequency interval of the multi-tone signal is greater than or equal to a notch bandwidth of the unilateral notch signal or the bilateral notch signal, and the multi-tone signal is generated by adjusting initial phases of different single-tone signals so that a peak-to-average power ratio of the multi-tone signal is close to that of the unilateral notch signal or the bilateral notch signal;
         measure a power of an additive Gaussian white noise of a nonlinear system by using the multi-tone signal;

measure a first power-to-noise ratio of the nonlinear system by using the bilateral notch signal;

measure a second power-to-noise ratio of the nonlinear system by using the unilateral notch signal; and calculate a nonlinear power-to-noise ratio of the nonlinear system and a power-to-noise ratio introduced by IQ imbalance, according to the power of the additive Gaussian white noise, the first power-to-noise ratio and the second power-to-noise ratio.

2. The apparatus according to claim 1, wherein to generate the bilateral notch signal, the process is to:

zero out a frequency component amplitude of a spectrum of a two-dimensional signal in a bilateral notch bandwidth and a mirror frequency bandwidth of the bilateral notch bandwidth via transmitter digital signal processing to generate the bilateral notch signal, or perform identical notch processing at identical frequency positions on real signals of I-path and Q-path of a two-dimensional signal to generate the bilateral notch signal.

3. The apparatus according to claim 2, wherein when the nonlinear system is a receiver, to generate the bilateral notch signal, the process is to perform filtering processing on a broad-spectrum light source via an optical waveform editor to directly generate the bilateral notch signal in an optical domain.

4. The apparatus according to claim 1, wherein to generate the unilateral notch signal, the process is to:

zero out a frequency component amplitude of a spectrum of a two-dimensional signal only within a bilateral notch bandwidth via transmitter digital signal processing to generate the unilateral notch signal.

5. The apparatus according to claim 4, wherein when the nonlinear system is a receiver, to generate the unilateral notch signal, the process is to perform filtering processing on a broad-spectrum light source via an optical waveform editor to directly generate the unilateral notch signal in an optical domain.

6. The apparatus according to claim 1, wherein to calculate the nonlinear power-to-noise ratio of the nonlinear system, the process is to:

calculate a nonlinear noise power of the nonlinear system according to a first average power, the first power-to-noise ratio and the power of the additive Gaussian white noise, the first average power being obtained by measuring the nonlinear system by using the bilateral notch signal;

calculate the nonlinear power-to-noise ratio according to the first average power and the nonlinear noise power; and calculate the power-to-noise ratio introduced by IQ imbalance according to the first power-to-noise ratio and the second power-to-noise ratio.

7. The apparatus according to claim 1, wherein the process is to calibrate the first power-to-noise ratio and the second power-to-noise ratio when a notch depth of the bilateral notch signal or the unilateral notch signal is less than or equal to a set threshold.

8. The apparatus according to claim 1, wherein the bilateral notch signal and the unilateral notch signal are isospectral equiprobability signals.

9. An apparatus to estimate performance of a nonlinear system, the apparatus comprising:

a measuring apparatus to measure nonlinear system noises according to claim 1; and a processor coupled to a memory to control execution of a process to, obtain, from the measuring apparatus, the power of the additive Gaussian white noise, the nonlinear power-to-noise ratio and the power-to-noise ratio introduced by IQ imbalance of the nonlinear system, at multiple notch center frequencies, establish an equivalent additive noise model according to the power of the additive Gaussian white noise, the nonlinear power-to-noise ratio and the power-to-noise ratio introduced by IQ imbalance of the nonlinear system at multiple center frequencies of notches, and estimate performance of the nonlinear system according to the equivalent additive noise model.

* * * * *